United States Patent
Collins et al.

(10) Patent No.: US 8,194,796 B2
(45) Date of Patent: Jun. 5, 2012

(54) METHODS AND APPARATUS FOR TRANSMITTING LAYERED AND NON-LAYERED DATA VIA LAYERED MODULATION

(75) Inventors: Bruce Collins, San Diego, CA (US);
Rajeev Krishnamurthi, San Diego, CA (US); Murali Ramaswamy Chair, San Diego, CA (US); Shusheel Gautam, San Diego, CA (US); Rajiv Vijayan, San Diego, CA (US); Seong Taek Chung, Redwood City, CA (US)

(73) Assignee: Qualcomm Incorporated, San Diego, CA (US)

( * ) Notice: Subject to any disclaimer, the term of this patent is extended or adjusted under 35 U.S.C. 154(b) by 300 days.

(21) Appl. No.: 12/607,879

(22) Filed: Oct. 28, 2009

(65) Prior Publication Data
US 2010/0046675 A1      Feb. 25, 2010

Related U.S. Application Data

(62) Division of application No. 11/330,796, filed on Jan. 11, 2006, now Pat. No. 7,630,451.

(60) Provisional application No. 60/660,873, filed on Mar. 10, 2005, provisional application No. 60/643,264, filed on Jan. 11, 2005.

(51) Int. Cl.
*H04L 27/06* (2006.01)

(52) U.S. Cl. .......... 375/340; 375/261; 375/298; 455/60; 370/203

(58) Field of Classification Search .................. 375/340, 375/261, 298; 370/20; 455/60
See application file for complete search history.

(56) References Cited

U.S. PATENT DOCUMENTS 4,039,961 A      8/1977  Ishio et al.
(Continued)

FOREIGN PATENT DOCUMENTS

JP          7254915          10/1995
(Continued)

OTHER PUBLICATIONS

Written Opinion—PCT/US06/001014—International Search Authority, EPO, Aug. 16, 2006.
Shi, "Image and Video Compression for Multimedia Engineering: Fundamentals, Algorithms, and Standards", CRC 2000, Chapter 19, "ITU-T Video Coding Standards H.261 and H.263", 19 pages.
Lim, "Labeling and Decoding Schemes for Backward-Compatible Hierarchical Coded Modulation", pp. 123-128, IEEE 2000.
(Continued)

*Primary Examiner* — Juan A Torres
(74) *Attorney, Agent, or Firm* — Gerald P. Joyce, III

(57) ABSTRACT

A media access control (MAC) layer controller can manage base layer data and enhancement layer data in a layered modulation system. The MAC layer controller can process both base layer data and enhancement layer data and map the encoded symbols to a layered modulation constellation when both are present. If data for one of the layers terminates, then the MAC layer controller can generate and supply predetermined stuffing data to the layer lacking additional data. The MAC layer controller can send a control signal to the physical layer hardware to cause the hardware to map the layered signals having the stuffing data to a modified signal constellation. The MAC controller can also generate an overhead message that indicates the occurrence of the stuffing data. The receiver can receive the overhead message and can use the information to configure the receiver for the layered modulation constellation or the modified signal constellation.

8 Claims, 11 Drawing Sheets

U.S. PATENT DOCUMENTS

| | | | |
|---|---|---|---|
| 5,995,150 | A | 11/1999 | Hsieh et al. |
| 6,330,280 | B1 * | 12/2001 | Suzuki et al. ............ 375/240.08 |
| 6,487,220 | B2 | 11/2002 | Matsuzaki et al. |
| 6,798,838 | B1 | 9/2004 | Ngo |
| 6,879,634 | B1 | 4/2005 | Oz et al. |
| 6,895,216 | B2 | 5/2005 | Sato et al. |
| 7,079,585 | B1 | 7/2006 | Settle et al. |
| 7,116,717 | B1 | 10/2006 | Eshet et al. |
| 7,173,981 | B1 | 2/2007 | Chen et al. |
| 7,369,621 | B2 * | 5/2008 | Yoshii et al. ................. 375/261 |
| 7,386,072 | B2 | 6/2008 | Uno |
| 7,418,246 | B2 | 8/2008 | Kim |
| 7,953,156 | B2 * | 5/2011 | Burazerovic et al. .... 375/240.24 |
| 2001/0012322 | A1 | 8/2001 | Nagaoka et al. |
| 2001/0012444 | A1 | 8/2001 | Ito et al. |
| 2003/0067637 | A1 | 4/2003 | Hannuksela |
| 2003/0171934 | A1 | 9/2003 | Zhang et al. |
| 2005/0157639 | A1 | 7/2005 | Song et al. |
| 2005/0196057 | A1 | 9/2005 | Suh |
| 2006/0193244 | A1 | 8/2006 | Le Goff |
| 2006/0227901 | A1 | 10/2006 | Gao et al. |
| 2006/0262846 | A1 | 11/2006 | Burazerovic et al. |

FOREIGN PATENT DOCUMENTS

| | | |
|---|---|---|
| JP | 2000295189 | 10/2000 |
| JP | 2001197028 | 7/2001 |
| WO | WO2004105302 | 12/2004 |

OTHER PUBLICATIONS

Schrammm, "Multilevel Coding with Independent Decoding on Levels for Efficient Communication on Static and Interleaved Fading Channels", pp. 1196-1200, IEEE 1997.

Wang, "Soft Decision Metric Generation for QAM with Channel Estimation", Error, pp. 1058-1061, IEEE 2002.

Sun, "MPEG Video Coding with Temporal Scalability", 1995 IEEE International Conference on Communications, 1995, ICC 95 Seattle, Gateway to Globalization, vol. 3, Jun. 18-22, 1995 pp. 1742-1746 vol. 3.

Yang, "High Fidelity Multichannel Audio Compression", Aug. 2002.

Hamazumi et al., "Trial Application of Spread Spectrum Technologies to Hierarchical Digital Broadcasting", Spread Spectrum Techniques and Applications Proceedings, 1996, IEEE 4th International Symposium on Mainz, Germany, vol. 2, pp. 776-780 (1996).

Ramchandran, "Multiresolution Broadcast for Digital HDTV Using Joint Source/Channel Coding", IEEE Journal on Selected Area in Communications, IEEE, Service Center, vol. 11, No. 1, pp. 6-22 (1993).

International Application No. PCT/US2006/001014, International Search Report, Applicant: Qualcomm Incorporated, International Filing Date: Jan. 11, 2006, pp. 1-5.

* cited by examiner

METHODS AND APPARATUS FOR TRANSMITTING LAYERED AND NON-LAYERED DATA VIA LAYERED MODULATION

CLAIM OF PRIORITY

This application is a divisional of U.S. patent application Ser. No. 11/330,796, filed Jan. 11, 2006, which claims the benefit of U.S. Provisional Application No. 60/660,873, filed Mar. 10, 2005, entitled "METHODS AND APPARATUS FOR TRANSMITTING LAYERED AND NON-LAYERED DATA VIA LAYERED MODULATION," and U.S. Provisional Application No. 60/643,264, filed Jan. 11, 2005, entitled "A METHOD OF TRANSMITTING A SINGLE LAYER DATA WHEN THE RECEIVER IS IN A LAYERED MODULATION MODE," each of which is hereby incorporated by reference herein in its entirety.

BACKGROUND OF THE INVENTION

Wireless communication systems are continually striving to increase the data bandwidth so that information can quickly be exchanged between devices coupled to the communication system. Some of the parameters that limit the data bandwidth available to devices include the spectral bandwidth allocated to the devices and the quality of the channel linking the devices.

Wireless communication systems compensate for the various constraints on data bandwidth using a variety of techniques. A wireless communication system may incorporate multiple encoding techniques, and may select an encoding technique based on a data rate supported by a channel. In such a system, the communicating devices may negotiate a data rate based on the capabilities of the channel. Such a communication system may be advantageous for multiple point to point links, but may be less than ideal in a distributed broadcast system where a single transmitter provides substantially the same data to multiple receivers.

Wireless communication systems may incorporate hierarchical modulation, also referred to as layered modulation, where multiple data streams are simultaneously transmitted across a hierarchy of data layers. The multiple data streams can include a base layer that is a robust communication link capable of successful reception in nearly all receiver operating conditions. The multiple data streams can also include an enhancement layer that is broadcast at a data rate that is lower, the same, or higher than the data rate of the base layer. The communications over the enhancement layer may require a higher signal quality at the receiver compared to the base layer. Therefore, the enhancement layer may be more sensitive to variations in the quality of the channel.

The receiver is typically ensured the ability to communicate at the base level, and can typically demodulate data on the base layer. In channel conditions sufficient to support the enhancement layer, the receiver is also able to demodulate additional data modulated on the enhancement layer to provide a higher quality of service or to provide additional data bandwidth.

The use of layered modulation signals substantially complicates the operation of the transmitter and receiver. Some data streams may have unrelated information on each of the base layer and enhancement layer. Because of the relative independence of the two layers, one layer, for example the enhancement layer, may complete a transmission or otherwise have no additional information to transmit while the base layer continues to supply information. The transmitter may not have the ability to selectively activate and deactivate layered modulation at the same rate that is needed to support intermittent operation of the enhancement layer. Alternatively, incorporating unlimited ability to select between layered or non-layered operation may be undesirable or unfeasible due to hardware constraints, cost, or established standards.

The intermittent lack of information for the various layers of a layered modulation signal creates potential problems at the transmitter and the receiver. The transmitter needs to have the ability to operate when there is information on less than all layers of a layered modulation signal. Additionally, the receiver needs to be able to discern when less than all layers of a layered modulation signal carry information. However, any potential solution must not overly burden the processing capabilities of the transmitter or the receiver.

BRIEF SUMMARY OF THE INVENTION

A media access control (MAC) layer controller can independently manage base layer data and enhancement layer data in a layered modulation system. The MAC layer controller can process both base layer data and enhancement layer data when both are present. The base layer data and enhancement layer data are encoded and mapped to a layered modulation constellation.

If data for one of the layers terminates, halts, completes, or otherwise ceases, then the MAC layer controller can generate and supply predetermined stuffing data to the layer lacking additional data. The MAC layer controller can send a control signal to the physical layer hardware to cause the physical layer hardware to map the layered signals having the stuffing data to a modified signal constellation. The MAC controller can also generate an overhead message that indicates the occurrence of the stuffing data.

The receiver can receive the overhead message and can use the information to configure the receiver for the layered modulation constellation or the modified signal constellation. The receiver can also locally generate the stuffing data in order to assist in the decoding of enhancement layer data.

Aspects of the invention include a method of transmitting layered and non-layered data in a layered modulation channel. The method includes receiving base layer data, encoding the base layer data to base layer symbols, receiving enhancement layer data, determining termination of the enhancement layer data prior to termination of the base layer data, generating stuffing data, appending the stuffing data to the enhancement layer data, and encoding the enhancement layer data appended with the stuffing data to enhancement layer symbols.

Aspects of the invention include a method of transmitting layered and non-layered data in a layered modulation channel. The method includes generating a layered signal during a first time slot of a logical channel having a plurality of time slots, mapping the layered signal to a layered modulation constellation, generating a non-layered signal during a second time slot of the logical channel, and mapping the layered signal to a non-layered modulation constellation.

Aspects of the invention include a transmitter configured to transmit layered and non-layered data over a layered modulation channel. The transmitter includes a base layer processing block configured to receive base layer data and encode the base layer data to base layer symbols, an enhancement layer processing block configured to receive enhancement layer data and encode the enhancement layer data to enhancement layer symbols, a signal mapper coupled to the base layer processing block and the enhancement layer processing block, and configured to map a combination of at least one base layer symbol with at least one enhancement layer symbols to a constellation point, and a controller configured to determine a termination of the enhancement layer data, generate stuffing data in response to the termination of the enhancement layer data, and couple the stuffing data to the enhancement layer processing block.

Aspects of the invention include a transmitter configured to transmit layered and non-layered data over a layered modulation channel. The transmitter includes a base layer processing block configured to receive base layer data and encode the base layer data to base layer symbols, an enhancement layer processing block configured to receive enhancement layer data and encode the enhancement layer data to enhancement layer symbols, a controller configured to generate a control signal based on a presence of enhancement layer data, and a signal mapper coupled to the base layer processing block and the enhancement layer processing block, and configured to map the base layer symbols and enhancement layer symbols to a constellation selected from a plurality of constellations based on the control signal.

Aspects of the invention include a receiver configured to receive layered and non-layered data over a layered modulation channel. The receiver includes a symbol deinterleaver configured to receive a tone modulated by a constellation point and generate a base layer symbol and an enhancement layer symbol from the tone, and further configured to generate a decoder control signal, a base layer processor coupled to the symbol deinterleaver, and configured to receive the base layer symbol and decode a base layer data, and an enhancement layer processor coupled to the symbol deinterleaver, and configured to receive the enhancement layer symbol and selectively decode an enhancement layer data based on the decoder control signal.

BRIEF DESCRIPTION OF THE DRAWINGS

The features, objects, and advantages of embodiments of the disclosure will become more apparent from the detailed description set forth below when taken in conjunction with the drawings, in which like elements bear like reference numerals.

DETAILED DESCRIPTION OF THE INVENTION

Figure 1:
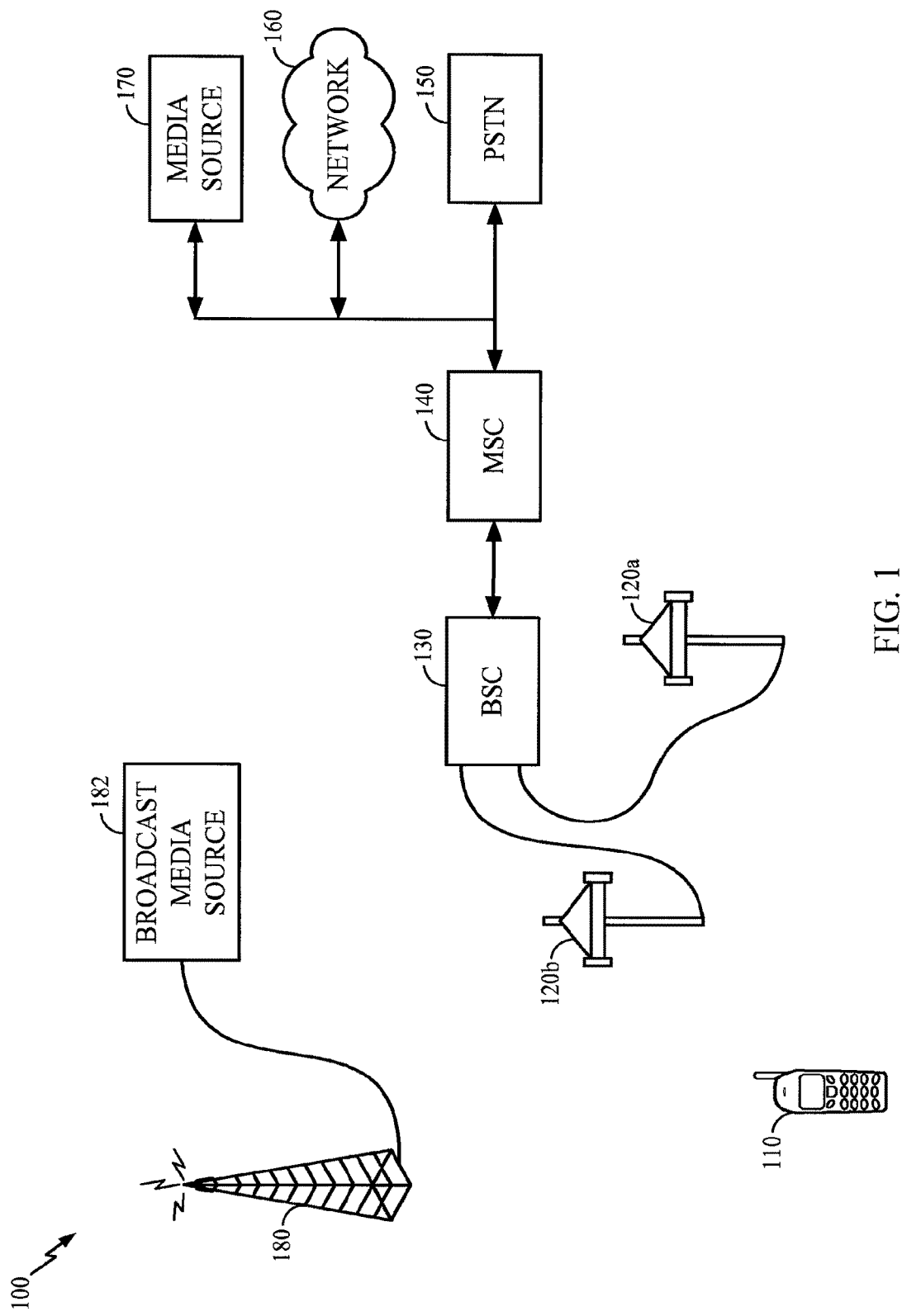
FIG. 1 is a functional block diagram of an embodiment of a wireless communication system incorporating hierarchical modulation.

Systems, methods, and apparatus are described for enabling transmission and reception of layered and non-layered data over a channel configured for layered modulation. A logical channel in a wireless communication system can be configured to support layered modulation. The layered modulation can have a plurality of layers. A first layer can be configured as a base layer and a second layer can be configured as an enhancement layer when two layers are defined.

The base layer and enhancement layer can be configured to operate substantially independently. Substantially independently refers to the independence of the data carried on the layers. The upper communication layers and the physical layer supporting the two modulation layers can have one or more blocks in common. However, the base layer and enhancement layer are substantially independent where the information carried on one layer does not rely on the information supplied on the other layer.

In another embodiment, a logical channel may time multiplex a plurality of independent layered modulation streams. Each stream can be independent of any other stream, and one or more streams assigned to the logical channel can cease generating layered data while other streams continue to generate layered data.

When a data source ceases to supply layered data for a logical channel configured for layered modulation, a media access control (MAC) layer controller can determine that non-layered data exists. The MAC layer controller can be configured to insert stuffing data, such as stuffing bits, stuffing symbols, stuffing packets, stuffing frames, or some combination thereof, into the data stream to emulate, imitate, or otherwise artificially generate a layered data source. The MAC layer controller can, for example, insert a predetermined bit sequence to the absent layer. The predetermined bit sequence can be a recurring bit sequence, a random or pseudorandom bit sequence, or can depend on the information supplied on the other layer. In the embodiment where the stuffing data is generated based on the data from the existing layer, the base and enhancement layer data is no longer substantially independent. However, the stuffing data carries no source information, but can be used to contribute to the ability to decode the base layer data at the receiver.

In one embodiment, the MAC layer controller can be configured to control a signal mapping module in the physical layer hardware. The physical layer hardware in the transmitter can be configured to support a plurality of signal constellations. The constellation used by the signal mapping module to which the base layer and enhancement layer data re mapped can be based in part on a control signal generated by the MAC layer controller.

When the base layer and enhancement layer both supply data, the MAC layer controller can control the signal mapping module to map the data to a layered modulation constellation. When the data source ceases supplying data to the enhancement layer, the MAC layer inserts stuffing data to the enhancement layer. The MAC layer controller also signals the signal mapping module to map the layered data having the stuffing data to a second modulation constellation, which may or may not correspond to a layered modulation constellation.

The MAC layer controller generates an overhead message to indicate the presence of stuffing data and the second modulation constellation to receivers. The receivers can configure their decoders to operate on the received data according to the overhead message. The receivers can use knowledge of the stuffing data to assist in recovering the base layer data.

FIG. 1 is a functional block diagram of an embodiment of a wireless communication system 100 incorporating hierarchical modulation, alternatively referred to as layered modulation. The system includes one or more fixed elements that can be in communication with a user terminal 110. The user terminal 110 can be, for example, a wireless telephone configured to operate according to one or more communication standards using layered modulation. For example, the user terminal 110 can be configured to receive wireless telephone signals from a first communication network and can be configured to receive data and information from a second communication network. In some embodiments, both communication networks can implement layered modulation, while in other embodiments one of the communication networks may implement layered coded modulation.

The user terminal 110 can be a portable unit, a mobile unit, or, a stationary unit. The user terminal 110 may also be referred to as a mobile unit, a mobile terminal, a mobile station, user equipment, a portable, a phone, and the like. Although only a single user terminal 110 is shown in FIG. 1, it is understood that a typical wireless communication system 100 has the ability to communicate with multiple user terminals 110.

The user terminal 110 typically communicates with one or more base stations 120a or 120b, here depicted as sectored cellular towers. The user terminal 110 will typically communicate with the base station, for example 120b, that provides the strongest signal strength at a receiver within the user terminal 110.

Each of the base stations 120a and 120b can be coupled to a Base Station Controller (BSC) 130 that routes the communication signals to and from the appropriate base stations 120a and 120b. The BSC 130 is coupled to a Mobile Switching Center (MSC) 140 that can be configured to operate as an interface between the user terminal 110 and a Public Switched Telephone Network (PSTN) 150. The MSC can also be configured to operate as an interface between the user terminal 110 and a network 160. The network 160 can be, for example, a Local Area Network (LAN) or a Wide Area Network (WAN). In one embodiment, the network 160 includes the Internet. Therefore, the MSC 140 is coupled to the PSTN 150 and network 160. The MSC 140 can also be coupled to one or more media source 170. The media source 170 can be, for example, a library of media offered by a system provider that can be accessed by the user terminal 110. For example, the system provider may provide video or some other form of media that can be accessed on demand by the user terminal 110. The MSC 140 can also be configured to coordinate inter-system handoffs with other communication systems (not shown).

In one embodiment, the base stations 120a and 120b can be configured to transmit layered modulation signals to the user terminal 110. For example, the base stations 120a and 120b can be configured to transmit a multicast signal that can be directed to the user terminal 110 as well as other receivers (not shown). The layered modulation signals can include a base layer signal that is configured to be robust, and an enhancement layer signal that operates at a lower link margin, and as a result, that is more sensitive to variations in the channel. The enhancement layer can be configured to provide supplemental data to the data supplied on the base layer or provide independent data that has a lower quality of service requirement.

The wireless communication system 100 can also include a broadcast transmitter 180 that is configured to transmit a layered modulation signal to the user terminal 110. In one embodiment, the broadcast transmitter 180 can be associated with the base stations 120a and 120b. In another embodiment, the broadcast transmitter 180 can be distinct from, and independent of, the wireless telephone system containing the base stations 120a and 120b. The broadcast transmitter 180 can be, but is not limited to, an audio transmitter, a video transmitter, a radio transmitter, a television transmitter, and the like or some combination of transmitters.

Although only one broadcast transmitter 180 is shown in the wireless communication system 100, the wireless communication system 100 can be configured to support multiple broadcast transmitters 180. A plurality of broadcast transmitters 180 can transmit signals in overlapping coverage areas. A user terminal 110 can concurrently receive signals from a plurality of broadcast transmitters 180. The plurality of broadcast transmitters 180 can be configured to broadcast identical, distinct, or similar broadcast signals. For example, a second broadcast transmitter having a coverage area that overlaps the coverage area of the first broadcast transmitter may also broadcast some of the information broadcast by a first broadcast transmitter.

The broadcast transmitter 180 can be configured to receive data from a broadcast media source 182 and can be configured to hierarchically code the data, modulate a signal based on the hierarchically coded data, and broadcast the layered modulation signals to a service area where it can be received by the user terminal 110. The broadcast transmitter 180 can generate, for example, base layer data and enhancement layer data from data received from the broadcast media source 182.

The layered modulation data configuration can be advantageous if the enhancement layer does not carry data that is redundant to that carried on the base layer. Additionally, the inability of the receiver to decode the enhancement layer may not result in loss of service. For example, the base layer can be configured to deliver video at a standard video resolution, and the enhancement layer can provide additional data that increases the resolution or SNR of the received video signal. In another embodiment, the base layer can be configured to provide a signal having a predetermined quality, such as a video signal at 15 frames per second, and the enhancement layer can be configured to supplement the information carried on the base layer. For example, the enhancement layer can be configured to carry information used to support a video signal at 30 frames per second. In such a configuration, the inability to decode the enhancement layer data results in lower resolution signal, lower signal quality, or SNR, but not a complete loss of signal.

The user terminal 110 can be configured to demodulate the received signal and decode the base layer. The receiver in the user terminal 110 can implement error control mechanisms as a standard part of the base layer decoder. The receiver in the user terminal 110 can use the error control mechanisms of the base layer decoder to determine a probability of successful enhancement layer decoding. The receiver in the user terminal 110 can then determine whether to decode the enhancement layer based on statistics or metrics generated in the error control mechanisms used in the base layer decoding.

In another embodiment, the user terminal 110 can be configured to substantially decode the base layer and enhancement layers concurrently, without relying on base layer information when decoding the enhancement layer. For example, the user terminal 110 can be configured to determine a single decoder threshold value and use the single decoder threshold value when decoding both the base and enhancement layer. The decoder threshold can be based in part on a characteristic of the layered modulation data. For example, the decoder threshold can be based on a ratio of the power or energy of the enhancement layer relative to the base layer. The decoder threshold can also be based in part on a desired error rate, such as a symbol error rate, bit error rate, packet error rate, or frame error rate. The decoder threshold can be fixed or may vary based, for example, on varying desired quality of service or varying characteristics of the layered modulation data.

Figure 2A:
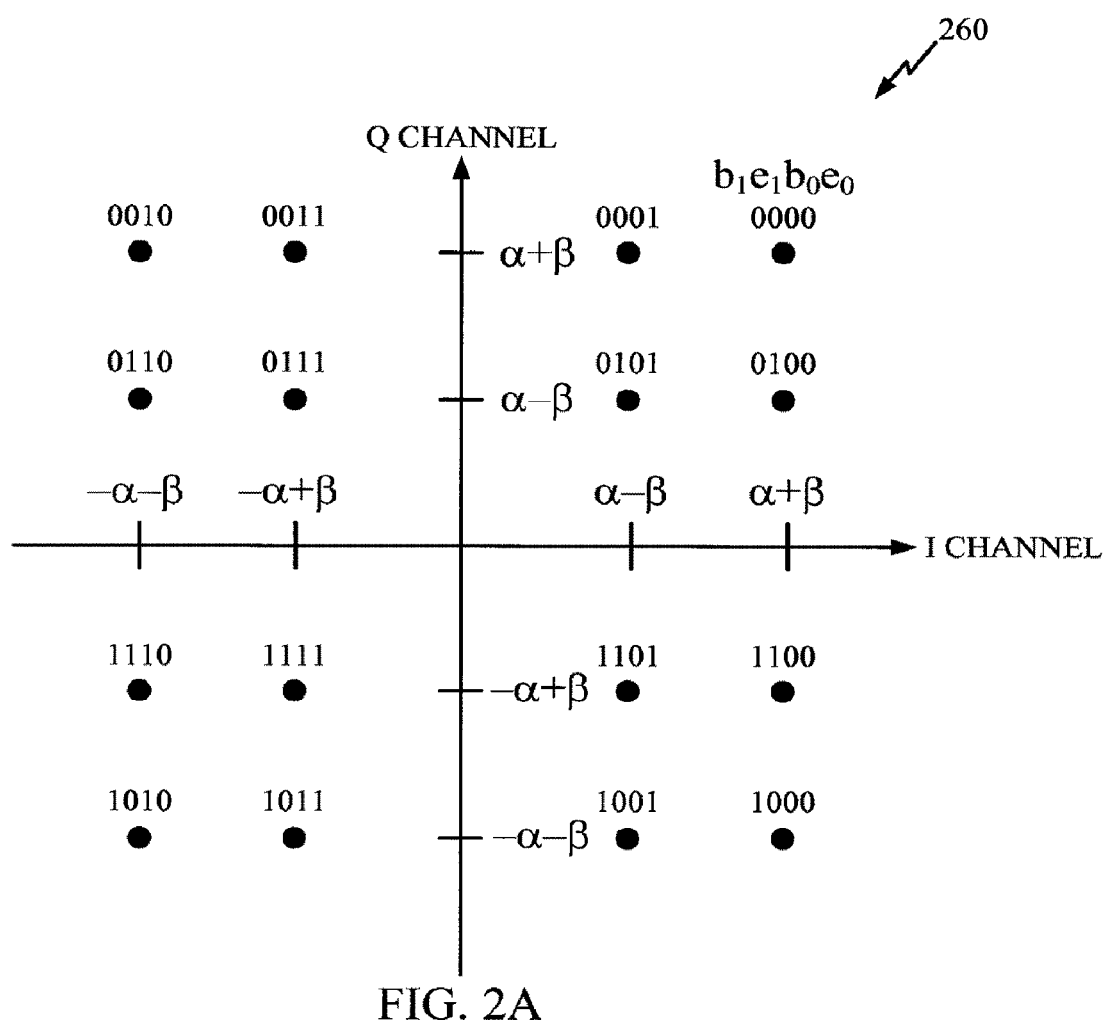
FIGS. 2A-2C are constellation diagrams for a layered modulation system.
Figure 2B:
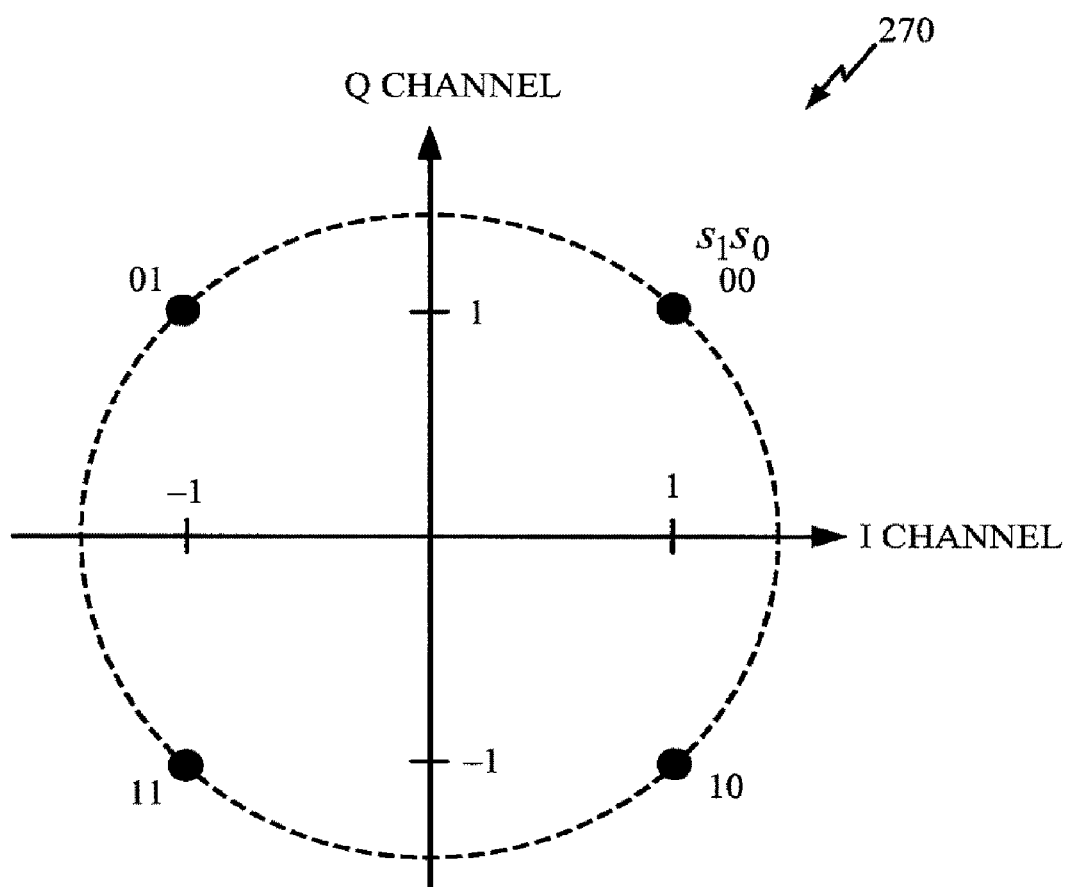
Figure 2C:
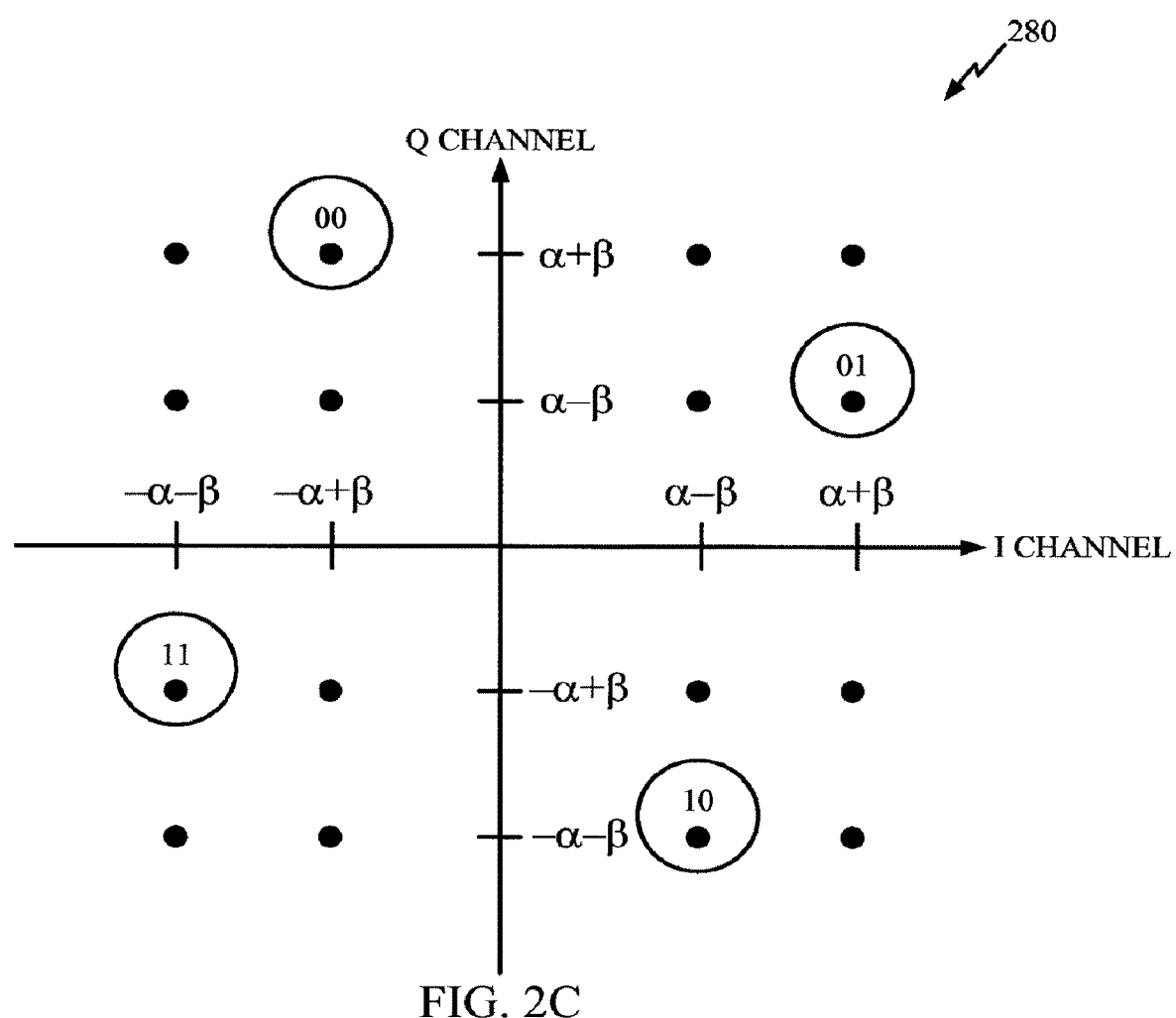

FIGS. 2A-2C show constellation diagrams of possible constellations that a signal mapping module can use in mapping the base layer and enhancement layer data. In one embodiment, the signal mapping module selects a constellation based on a control input received from the MAC layer controller. The constellation diagrams shown in FIGS. 2A-2C are not limitations on the types of constellations that can be used in a layered modulation system, but instead are provided as examples of a particular embodiment of a two-layer modulation system.

FIG. 2A is a constellation diagram 260 of an embodiment of a particular layered modulation implementation. The constellation diagram 260 of FIG. 2A is substantially a 16-QAM constellation in which the base layer data maps to a particular quadrant of the constellation, and the enhancement layer data maps to the particular position within the constellation. The 16-QAM constellation 260 does not need to be consistently spaced, but may be modified to have a consistent spacing within each quadrant and a distinct spacing between the nearest points within different quadrants. Furthermore, some of the points in the constellation may be mirrored with respect to a midpoint in the quadrant.

The input to a signal mapping block includes 2 bits from the base layer ($b_1$ $b_0$) and 2 bits from the enhancement layer ($e_1$ $e_0$). The base layer stream is transmitted at a higher power level with respect to the enhancement layer stream and the energy ratio r satisfies the following relationship:

$$r = \frac{\alpha^2}{\beta^2}.$$

By normalizing the average constellation point energy (=$2\alpha^2+2\beta^2$) to 1, $\alpha$ and $\beta$ can be expressed in terms of energy ratio r as $$\alpha = \sqrt{\frac{r}{2(1+r)}}$$

$$\beta = \sqrt{\frac{1}{2(1+r)}}$$

The same energy ratio can be used for multiple tones in the same logical channel of an Orthogonal Frequency Division Multiplexing (OFDM) system, where a logical channel can include one or more tones from the OFDM group of tones. However, the energy ratio can change from logical channel to logical channel. Therefore, the signal mapping block can map the same data to different constellations depending on the energy ratio, with the constellation determined by the energy ration. Thus, an OFDM symbol can include multiple logical channels. The tones of a particular logical channel can have a different energy ratio relative to tones corresponding to another logical channel in the same OFDM symbol.

For example, a signal mapping block can be configured to map base and enhancement layer data to one of two constellation, where the two constellations correspond to energy ratios of 4 and 9. Note, the layered modulation signal constellation follows the Gray mapping, and the signal constellation for layered modulation is equivalent to the signal constellation of 16-QAM when the energy ratio, r, is equal to 4.

FIG. 2B is another embodiment of a constellation diagram 270. The constellation diagram 270 of FIG. 2B corresponds to a QPSK constellation, and supports two bits per symbol. As such, the constellation diagram 270 of FIG. 2B does not support layered modulation when the two bits originate from the same layer. In one embodiment, the distance between the constellation points can be adjusted to obtain an energy ratio of one.

FIG. 2C is another embodiment of a constellation diagram 280. The constellation diagram 280 of FIG. 2C includes four constellation points selected from the constellation diagram 260 of FIG. 2A. The constellation points selected from the constellation diagram 260 of FIG. 2A correspond to the four constellation points that maximize the minimum distance between any two adjacent constellation points. Of course, other criteria can be used to select other constellation points, or some other constellation diagram can be used in the system.

Figure 3:
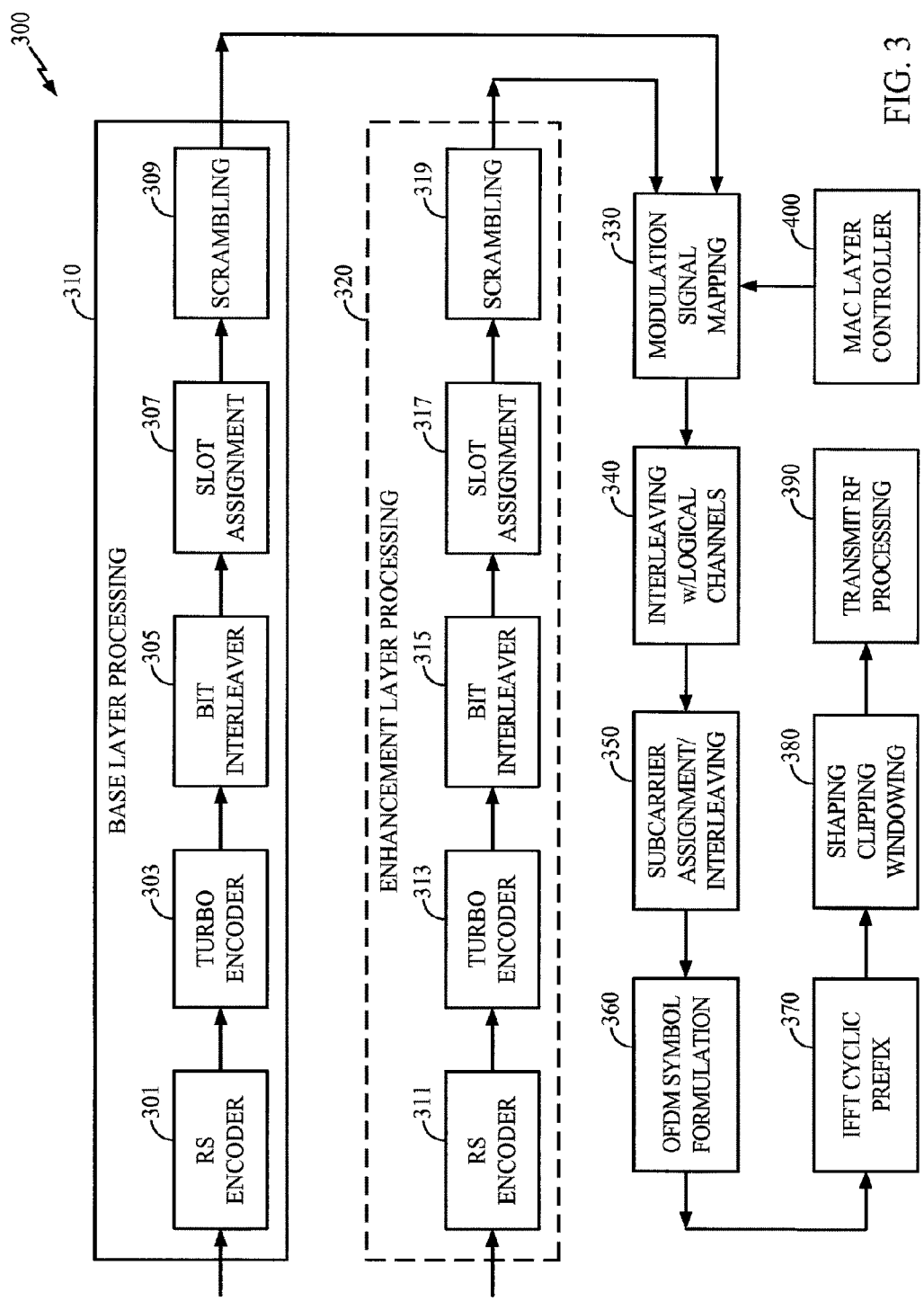
FIG. 3 is a simplified functional block diagram of an embodiment of a transmitter in a layered modulation system.

FIG. 3 is a functional block diagram of an embodiment of a transmitter 300 configured for a layered modulation system. In one embodiment, the transmitter 300 can be implemented in the broadcast transmitter of the system of FIG. 1. The transmitter 300 of FIG. 3 can be configured for layered modulation in an Orthogonal Frequency Division Multiple Access (OFDMA) or Orthogonal Frequency Division Multiplex (OFDM) system.

The transmitter 300 can be configured to map the base layer data and enhancement layer data to the constellation diagram of FIG. 2A when both base layer data and enhancement layer data are present. The transmitter 300 can be configured to select an alternative constellation, such as one of the constellations of FIG. 2B or 2C, when the enhancement layer terminates or otherwise is no longer supplied to the transmitter 300.

However, the transmitter 300 shown in FIG. 3 represents an embodiment and is not a limitation on the disclosed apparatus and methods. For example, a single carrier system can be modulated with layered modulation data, and the corresponding decoder in a receiver can be configured to operate on a single carrier with layered modulation.

The transmitter 300 can include substantially similar base layer and enhancement layer processing blocks, 310 and 320, respectively. The base layer processing block 310 can be configured to process base layer data into a desired modulation format, for example QPSK. The enhancement layer processing block 320 can be similarly configured to process enhancement layer data into a desired modulation format, for example QPSK.

The base layer processing block 310 and the enhancement layer processing block 320 receive the respective data from a source encoder (not shown), which can be the broadcast media source of FIG. 1. The enhancement layer processing block 320 can also be configured to receive stuffing data from a MAC layer controller 400 when the source encoder (not shown) ceases supplying the enhancement data.

In one embodiment, the base layer data and the enhancement layer data can include video signals, audio signals, or some combination of video and audio signals. The video/audio signal in the base layer corresponds to the data required to reproduce basic quality of service at the receiver. The video/audio signal in the enhancement layer corresponds to the additional data required to generate more enhanced quality of service at the receiver. Hence, users capable of decoding two layers (base layer and enhancement layer) can enjoy fully enhanced quality of video/audio signal while users capable of decoding the base layer can get a minimum quality of video/audio signal.

Within each of the base layer processing block 310 and the enhancement layer processing block 320, the data is coupled to a Reed Solomon encoder 301 or 311 for block coding. The output of the Reed Solomon encoders 301 and 311 are coupled to respective turbo encoders 303 and 313. The turbo encoders 303 and 313 can be configured to turbo encode the data according to a predetermined encoding rate. The encoding rate can be fixed or selectable from a plurality of encoder rates. For example, the turbo encoders 303 and 313 can independently be configured to provide a coding rate of 1/3, 1/2, or 2/3.

The turbo encoder 303 and 313 outputs are coupled to respective bit interleavers 305 and 315 to improve resistance to burst errors. The output of the bit interleavers 305 and 315 are coupled to respective slot assignment modules 307 and 317. The slot assignment modules 307 and 317 can be configured to time align the encoded symbols with a predetermined time slot, such as an interleaving time slot in a time division multiplexed system. The outputs of the slot alignment modules 307 and 317 are coupled to respective scramblers 309 and 319. The output of the scramblers 309 and 319 represent the encoded base layer and enhancement layer symbols.

The symbols from the two layers are combined at a signal mapper 330. The signal mapper 330 can be configured to map the base and enhancement layer symbols to a particular point in the constellation for the layered modulation. For example, the signal mapper 330 can be configured to map one or more base layer symbols along with one or more enhancement layer symbols to a single point in the layered modulation constellation. The signal mapper 330 can be configured to map each logical channel to a constellation having a predetermined energy ratio. However, different logical channels can be mapped to constellations having different energy ratios.

The output of the signal mapper 330 is coupled to a time interleaver 340 that is configured to interleave the mapped constellation point to a particular slot in a logical channel. As described earlier, the system may implement a time division multiplex configuration where a single layered modulation stream is time multiplexed with a plurality of other layered modulation streams on the same logical channel. The aggregate of signal streams can be time interleaved, or otherwise time multiplexed, using a predetermined time multiplex algorithm, such as a round robin assignment.

The output of the time interleaver 340 is coupled to a subcarrier assignment module 350. The subcarrier assignment module can be configured to assign one or more tones, frequencies, or subcarriers from an OFDM tone set to each set of time interleaved logical channels. The subset of subcarriers assigned to a set of time interleaved logical channels can range from one channel to a plurality of subcarriers up to all available subcarriers. The subcarrier assignment module 350 can map a serial time interleaved set of logical channels to a subset of subcarriers according to a predetermined algorithm. The predetermined algorithm can be configured to assign the logical channels in a persistent manner, or can be configured to assign subcarriers according to a frequency hopping algorithm.

The output of the sub carrier assignment module 350 is coupled to an OFDM symbol module 360 that is configured to modulate the sub carriers based on the assigned layered modulation symbol. The modulated OFDM sub carriers from the OFDM symbol module 360 are coupled to an Inverse Fast Fourier Transform (IFFT) module 370 that can be configured to generate an OFDM symbol and append or prep end a cyclic prefix or a predetermined length.

The OFDM symbols from the IFFT module 370 are coupled to a shaping block 380 where the OFDM symbols can be shaped, clipped, windowed, or otherwise processed. The output of the shaping block 380 is coupled to a transmit RF processor 390 for conversion to a desired operating frequency band for transmission. For example, the output of the transmit RF processor 390 can include or be coupled to an antenna (not shown) for wireless transmission.

When the source encoders (not shown) supply base layer data and enhancement layer data to the respective processing blocks 310 and 320, the MAC layer controller 400 controls the signal mapper 330 to map the base layer symbols and enhancement layer symbols to a first constellation, such as the constellation diagram of FIG. 2A. When the source encoder (not shown) ceases or otherwise terminates the supply of enhancement data, the MAC layer controller determines the absence of the enhancement layer data. The MAC layer controller 400 generates and supplies stuffing data to the input of the enhancement layer processing block 320. The MAC layer controller 400 can optionally control the signal mapper 330 to map the base layer data and enhancement layer data having the stuffing data to a second constellation, such as the constellation of FIG. 2B or 2C.

Because the enhancement layer processing block 320 includes a Reed Solomon encoder 311, a bit interleaver 315, and a scrambler 319, the order of the enhancement layer symbols likely do not coincide with the order of the input enhancement layer data. Thus, the MAC layer controller 400 can be configured to control the constellation change of the signal mapper 330 at predetermined times, instances, intervals, or events, such as following the completion of an interleaved and scrambled Reed-Solomon block.

In another transmitter 300 embodiment, the enhancement layer processing block 320 may omit the bit interleaver 315 and scrambler 319. In such an embodiment, the output of the Reed-Solomon encoder 311 is coupled to the turbo encoder 313, and the turbo encoded data can be assigned to a particular time slot. In such an embodiment, the MAC layer controller 400 can be configured to control the constellation of the signal mapper 330 at a time that coincides approximately with the stuffing data.

A receiver receiving a transmission having only a portion of a Reed Solomon code block can locally regenerate the stuffing data using the same algorithm used by the MAC layer controller 400 to generate the stuffing data. The locally generated stuffing data can be used to help recover the received base layer data. Thus, the receiver does not require transmission of the stuffing data, and does not need to process the received signals corresponding to stuffing data.

The MAC layer controller 400 generates an overhead message in order to communicate the change in the signal constellation or the inclusion of stuffing data. In one embodiment, the MAC layer controller 400 can generate an overhead message that is transmitted on an overhead channel. In another embodiment, the MAC layer controller 400 can be configured to include the information in a header that accompanies the modulated stream. The header can indicate, for example, the length of the enhancement layer data, and thus the beginning f the stuffing data.

In one embodiment, the MAC layer controller 400 can be configured to generate random or pseudorandom stuffing data. The MAC layer controller 400 can also be configured to use the same constellation for layered and non-layered data. In such an embodiment, the receiver does not benefit by the use of the stuffing data, unless the stuffing data can be used to assist the decoding of a portion of the Reed-Solomon encoded enhancement layer data.

In another embodiment, the MAC layer controller 400 can be configured to use the constellation of FIG. 2B when generating the stuffing data. In such an embodiment, the signal mapper 330 maps the base layer symbols to QPSK constellation points. The signal mapper 330 virtually ignores the stuffing data.

In another embodiment, the MAC layer controller 400 selects stuffing data based on the base layer data in order to maintain the constellation of FIG. 2C. However, this embodiment may require significantly more signal processing as the effects of the Reed Solomon encoder 313, bit interleaver 315, and scrambler 319 need to be accounted for in generating the stuffing data.

Figure 4:
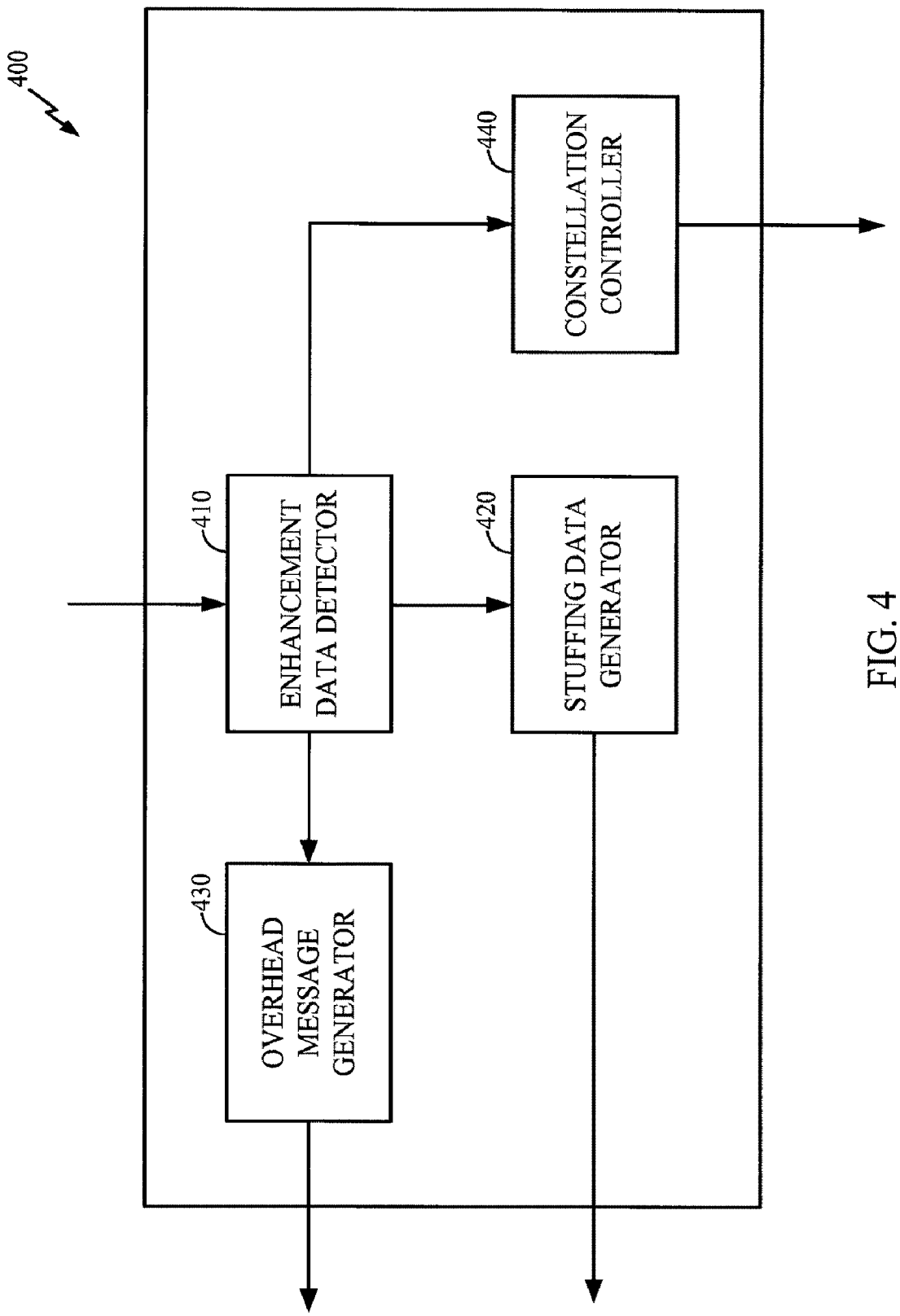
FIG. 4 is a simplified functional block diagram of an embodiment of a media access control layer controller.

FIG. 4 is a simplified functional block diagram of an embodiment of a MAC layer controller 400, such as the one shown in the transmitter of FIG. 3. The MAC layer controller 400 includes an enhancement data detector 410 coupled to a stuffing data generator 420, overhead message generator 430, and constellation controller 440.

The enhancement data detector 410 can be configured to directly monitor the enhancement layer source for the presence of enhancement layer data. Alternatively, or in addition, the enhancement data detector 410 can receive a control message, for example from an upper logical layer, such as an application layer or a network layer, that informs the enhancement data detector of the impending completion or cessation of enhancement layer data.

Upon determining the termination or absence of enhancement layer data, the enhancement data detector 410 initiates the stuffing data generator 420. The stuffing data generator 420 generates a predetermined stuffing data sequence and couples the stuffing data to the input of an enhancement layer processing block. The enhancement layer processing block need not actually encode the stuffing data, because the data represents dummy data. However, having the enhancement layer processing block process the stuffing data may simplify the hardware implementation.

The stuffing data generator 420 can generate, for example, a predetermined sequence, such as all ones, all zeros, or a predetermined pattern. In another embodiment, the stuffing data generator 420 can generate stuffing data using a predetermined generator algorithm such as a polynomial. The stuffing data can be a random or pseudorandom sequence.

The enhancement data detector 410 can also initiate an overhead message generator 430 that is configured to generate an overhead message that indicates the inclusion of the stuffing data. Because the signal mapper may not actually encode the stuffing data, the overhead message may be important to the receiver for the purposes of recovering data.

The enhancement data detector 410 can also control the constellation controller 440 that is configured to control the signal constellation used by the signal mapper. In some embodiments, the constellation controller 440 can be omitted, and the same constellation used for both layered and non-layered data. In other embodiments, a first layered modulation constellation is used for the layered modulation, and a second non-layered constellation is used for the non-layered data.

Figure 5:
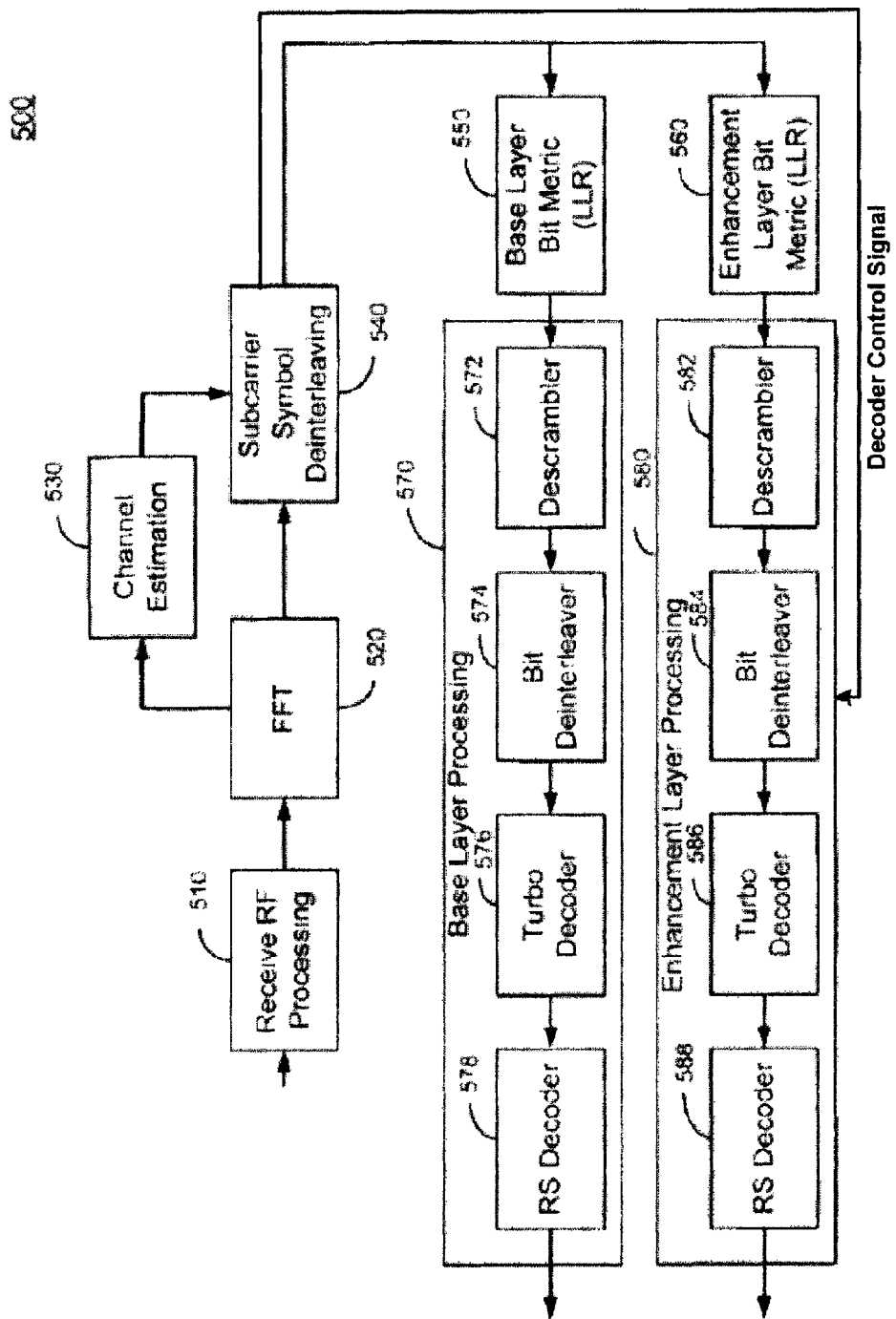
FIG. 5 is a simplified functional block diagram of an embodiment of a receiver configured for operation in a hierarchical modulation system.

FIG. 5 is a simplified functional block diagram of an embodiment of a receiver 500. The receiver generally performs the complement of the transmitter operations.

The receiver 500 includes a receive RF processor configured to receive the transmitted RF OFDM symbols, process them and frequency convert them to baseband OFDM symbols or substantially baseband signals. A signal can be referred to as substantially a baseband signal if the frequency offset from a baseband signal is a fraction of the signal bandwidth, or if signal is at a sufficiently low intermediate frequency to allow direct processing of the signal without further frequency conversion. The OFDM symbols from the receive RF processor 510 are coupled to a Fast Fourier Transform (FFT) module 520 that is configured to transform the OFDM symbols to the layered modulation frequency domain subcarriers.

The FFT module 520 can be configured to couple one or more subcarriers, such as predetermined pilot subcarriers, to a channel estimator 530. The pilot subcarriers can be, for example, one or more equally spaced sets of OFDM subcarriers. The channel estimator 530 is configured to use the pilot subcarriers to estimate the various channels that have an effect on the received OFDM symbols. In one embodiment, the channel estimator 530 can be configured to determine a channel estimate corresponding to each of the subcarriers. The channel estimates at a particular subcarrier can be used as a channel estimate for adjacent subcarriers, for example, those subcarriers within a predetermined coherence bandwidth of the pilot subcarrier.

The subcarriers from the FFT module 520 and the channel estimates are coupled to a subcarrier symbol deinterleaver 540. The symbol deinterleaver 540 can be configured to reverse the modulation performed by the subcarrier assignment module of FIG. 3. the symbol deinterleaver 540 can also be configured to generate a decoder control signal. The symbol deinterleaver 540 can generate the decoder control signal, for example, based on the overhead message transmitted by the transmitter informing of the presence and location of stuffing data. The symbol deinterleaver 540 can couple the decoder control signal to the enhancement layer decoder to selectively deactivate it when the overhead message indicates the enhancement layer contains solely stuffing data. The decoder control signal can also be used by the enhancement layer decoder to selectively generate stuffing data and append the stuffing data to the received enhancement layer symbols or decoded enhancement layer data in order to assist in the decoding process. For example, the enhancement layer decoder can generate stuffing data and can append the stuffing data to the enhancement layer data at the Reed Solomon decoder in order to assist in error correction and detection.

The receiver 500 is configured to perform base layer decoding and enhancement layer decoding on each OFDM subcarrier or tone. FIG. 5 illustrates a single base layer decoder and enhancement layer decoder for the sake of clarity and brevity.

The base layer decoder and enhancement layer decoder can operate substantially in parallel. Each of the decoder modules can be configured to operate concurrently on the same received constellation points. The enhancement layer decoder can thus operate substantially independently of the base layer decoder and does not rely on the results of the base layer decoder when decoding the enhancement layer data. The base layer decoder and enhancement layer decoders can be considered to operate substantially independently even though the decoders share some sub-modules, provided the enhancement layer decoder does not rely on the decoding results obtained from the base layer decoder. Thus, the base layer decoder and enhancement layer decoder can share channel estimates, and can even share a single bit metric module, for example 550. Yet, the decoders can be considered substantially independent if the enhancement layer decoder does not rely on the results of the base layer decoder when decoding the enhancement layer data.

The decoders illustrated in the receiver 500 embodiment of FIG. 5 are configured to decode turbo encoded layered modulation data. Of course, if the transmitter is configured to generate some other type of encoding, the decoders in the receiver 500 would be matched to the encoder type. For example, the transmitter can be configured to encode the data using turbo coding, convolutional coding, Low Density Parity Check (LDPC) coding, or some other encoding type. In such an embodiment, the receiver 500 is configured with the complementary decoders. Thus, each of the base layer decoders and enhancement layer decoders in the receiver 500 can be configured to provide turbo decoding, convolutional decoding, such as using Viterbi decoding, LDPC decoding, or some other decoder or combination of decoders.

Each of the layered modulation tones is coupled to a base layer bit metric module 550 and an enhancement layer bit metric module 560. The bit metric modules 550 and 560 can operate on the layered modulation tone to determine a metric indicative of the quality of the received constellation point.

In one embodiment, where the symbols represented in the constellation point are turbo coded, the bit metric modules 550 and 560 can be configured to determine a log likelihood ratio (LLR) of the received symbols represented by the constellation point. The LLR is the logarithm of the likelihood ratio. The ratio can be defined as the probability that the original bit is 1 over the probability that the original bit is equal to 0. Alternatively, the ratio can be defined in a reverse way, where the LLR is the probability that the original bit is 0 over the probability that the original bit is equal to 1. There is no substantial difference between these two definitions. The bit metric modules 550 and 560 can use, for example, the constellation point magnitudes and the channel estimate to determine the LLR values.

Each bit metric module 550 and 560 utilizes a channel estimate and a received signal to determine a LLR value. A noise estimate may also be used. However, the noise estimate term can be substantially ignored if a turbo decoding method that provides the same results regardless of the noise estimate is used. In such an embodiment, the bit metric modules 550 and 560 hardware can use a predetermined value as the noise estimate in calculating LLR values.

The output of the base bit metric module 550 is coupled to a base layer processor 570. The output of the enhancement layer bit metric module 560 is coupled to an enhancement layer processor 580 that functionally, operates similarly to the base layer processor 570. For example, the LLR values are coupled from the bit metric modules 550 and 560 to the respective base layer or enhancement layer processors 570 and 580.

The base layer processor 570 includes a descrambler 572 configured to operate on the received LLR values to reverse the symbol scrambling performed in the encoder. The output of the symbol descrambler 572 is coupled to a bit deinterleaver 574 that is configured to deinterleave the previously interleaved symbols. The output of the bit deinterleaver 574 is coupled to a turbo decoder 576 that is configured to decode turbo encoded symbols according to the coding rate used by the turbo encoder. For example, the turbo decoder 576 can be configured to perform decoding of rate 1/3, 1/2, or 2/3 turbo encoded data. The turbo decoder 576 operates, for example, on the LLR values. The decoded outputs from the turbo decoder 576 is coupled to a Reed Solomon decoder 578 that can be configured to recover the base layer bits based in part on the Reed Solomon encoded bits. The resulting base layer bits are transferred to a source decoder (not shown).

The enhancement layer processor 580 operates similar to the base layer processor 570. A descrambler 582 receives the LLR values from the enhancement bit metric module 560. The output is coupled to a bit deinterleaver 584 and the turbo decoder 586. The output of the turbo decoder 586 is coupled to the Reed Solomon decoder 588. The resulting enhancement layer bits are transferred to a source decoder (not shown).

When stuffing data is used, the enhancement layer may not be transmitted. In such an embodiment, the enhancement layer processor 580 can be idle or otherwise powered down to conserve power. In another embodiment, the base layer processor 570 and enhancement layer processor 580 can continue to decode signals regardless of whether the transmitted signal is a layered signal or a non-layered signal that can be generated as a result of a base layer only mode. The base layer processor 570 and the enhancement layer processor 580 need not have any knowledge of the operating mode or constellation diagram used by the transmitter. The receiver 500 can be configured to always assume a layered modulation constellation. The decoded data may contain layered data having both base data and enhancement data, or may include only base data and the decoded data from the enhancement processor 580 can be discarded by subsequent processing stages (not shown).

Figure 6:
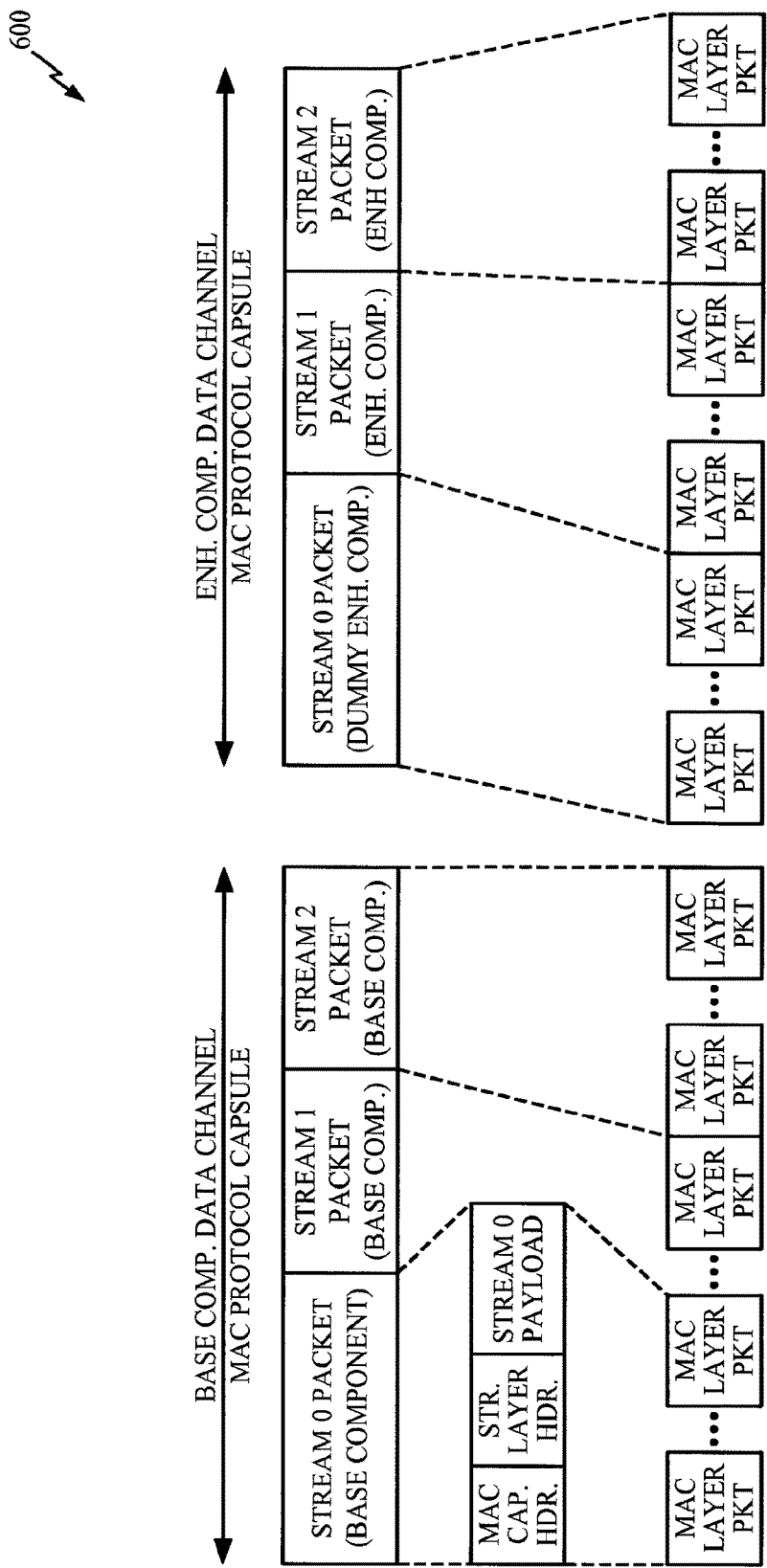
FIG. 6 is a simplified functional block diagram of a stream configuration for a logical channel of a layered modulation system.

FIG. 6 is a simplified functional block diagram of a stream configuration 600 for a logical channel of a layered modulation system. The stream configuration can be used, for example, in the system of FIG. 1.

There is at least one Data Channel MAC Protocol Capsule corresponding to each of the Base component and Enhancement component. The size of the stream packets within each capsule may be mandated to be equal. A single field can be used to carry the stream packet size in terms of number of MAC Layer packets. This field applies to the stream packets in both Base component capsule as well as the Enhancement component capsule.

For streams that are configured as "Base Layer only", there is no Enhancement Component provided by the Stream Layer to the Data Channel MAC layer on the network side. In this case, the Data Channel MAC layer creates virtual Stream packet that contains stuffing data that can be a known pattern, thereby making the stream packet layout of the Base and Enhancement component of MAC layer capsule substantially identical.

On the network side, while delivering the MAC layer packets to the physical layer, MAC layer identifies the packets containing stuffing packets and instructs the physical layer not to transmit the stuffing data, or not to transmit a majority of the stuffing data. For error control of blocks consisting entirely of stuffing data, MAC layer instructs the physical layer not to transmit the parity packets as well.

Figure 7:
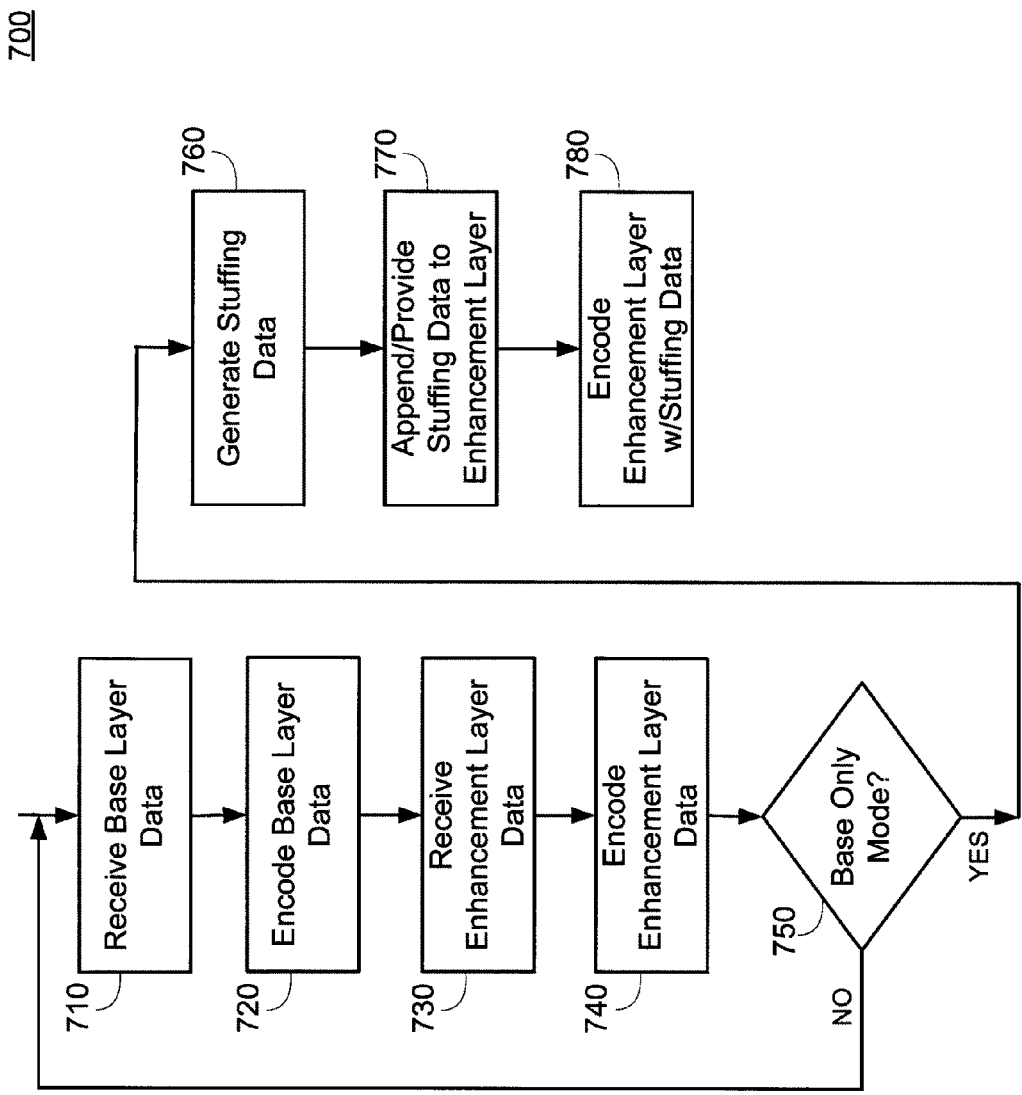
FIG. 7 is a simplified flowchart of a method of generating layered and non-layered data in a layered modulation system.

FIG. 7 is a simplified flowchart of a method 700 of generating layered and non-layered data in a layered modulation system. The method 700 can be performed, for example, by the transmitter of FIG. 3.

The method 700 begins at block 710, where the transmitter receives base layer data. The act of receiving the base layer data can include receiving the base layer data from a source encoder, such as a media source. the transmitter proceeds to block 720 and encodes the base layer data.

The transmitter proceeds to block 730 and receives enhancement layer data. In some embodiments the enhancement layer data is related to the base layer data, while in other embodiments the base data and enhancement layer data are independent. The transmitter can, for example, receive the enhancement layer data from a media source. The transmitter proceeds to block 740 and encodes the enhancement layer data. The transmitter may perform enhancement layer processing before, after, or concurrently with base layer processing shown in blocks 710 and 720.

The transmitter proceeds to decision block 750 and determines if a base only mode is active. A base only mode may occur, for example, when an application in the system is configured to send high priority data, and the system desires high likelihood of successful receipt of the data. Alternatively, or in addition, a base only mode may occur as a result of an enhancement layer data completing, terminating, ceasing, or otherwise halting. The enhancement layer data may terminate or cease when the enhancement layer data is independent of the base layer data and the enhancement layer data has been completely delivered.

If the transmitter determines that a base only mode is not active, the transmitter returns from decision block 750 to block 710 to continue to process the two layers of data. However, if the transmitter determines that base only mode is active, the transmitter proceeds from decision block 750 to block 760.

At block 760, the transmitter generates stuffing data in response to the base only mode. The stuffing data can be predetermined data that can include a predetermined sequence of bits, predetermined bits, pseudorandom bits, random bits, or some other bit sequence or combination of bit sequences.

The transmitter proceeds to block 770 and appends or otherwise provides the stuffing bits to the enhancement layer processing path. For example, the transmitter can provide the stuffing bits to the enhancement layer encoder. The transmitter proceeds to block 780 and encodes the enhancement layer having the stuffing data.

Figure 8:
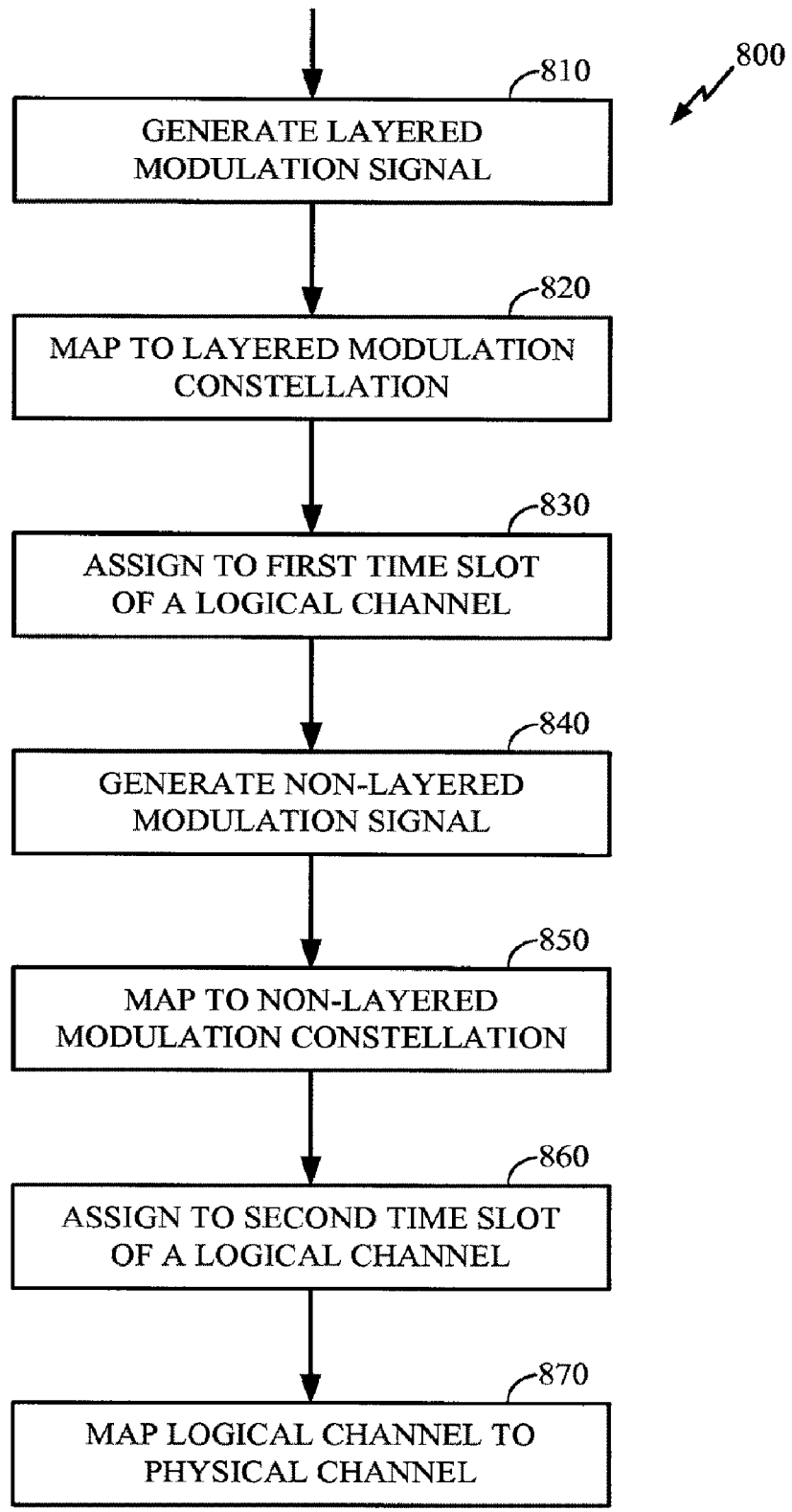
FIG. 8 is a simplified flowchart of a method of generating layered and non-layered data in a layered modulation system.

FIG. 8 is a simplified flowchart of a method 800 of generating layered and nonlayered data in a layered modulation system. The method 800 can be performed, for example, by the transmitter of FIG. 3.

The method 800 begins at block 810 where the transmitter generates a layered modulation signal. For example, the transmitter can generate a layered modulation signal having a base layer and an enhancement layer. The transmitter proceeds to block 820 and maps the layered modulation signal to a layered modulation constellation. For example, the transmitter can map a base layer symbol in conjunction with an enhancement layer symbol to a constellation point of the constellation shown in FIG. 2A. The transmitter proceeds to block 830 and assigns the mapped constellation point of the layered modulation signal to a first time slot of a logical channel of a logical channel having a plurality of time multiplexed time slots.

The transmitter proceeds to block 840 and generates a non-layered modulation signal. For example, the transmitter can generate a base layer only signal in response to a base only mode. The transmitter proceeds to block 850 and maps the non-layered modulation signal to a non-layered modulation constellation point. For example, the transmitter can be configured to map a non-layered modulation signal to a constellation point from the constellation of FIG. 2B.

The transmitter proceeds to block 860 and assigns the constellation point from the non-layered modulation signal to a second time slot of the same logical channel having the layered modulation in the first time slot. The transmitter proceeds to block 870 and maps the logical channel to a physical channel for transmission. For example, the transmitter can be configured to map the logical channel to one or more subcarriers of one or more OFDM symbols.

Figure 9:
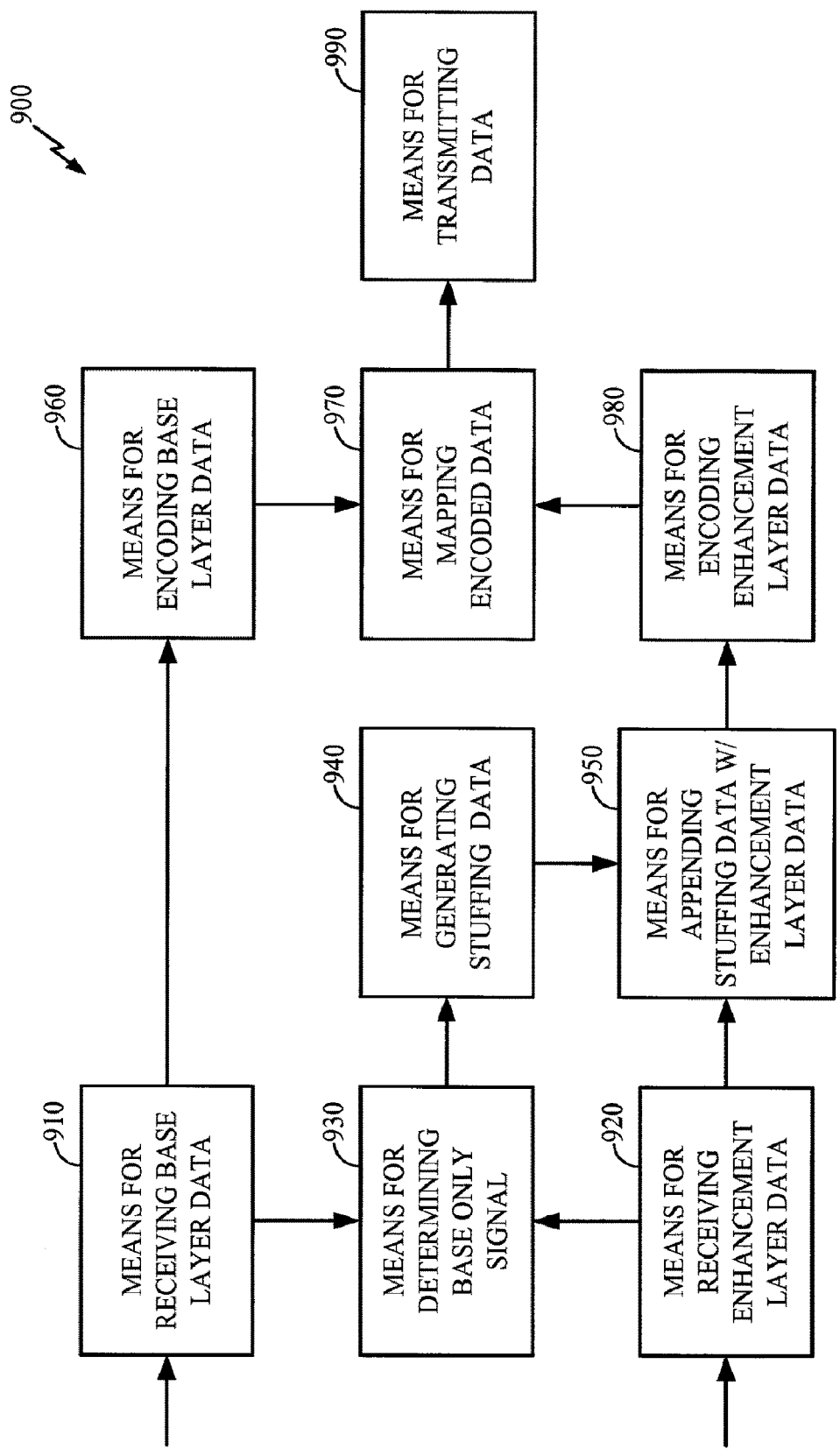
FIG. 9 is a simplified functional block diagram of an embodiment of a transmitter in a layered modulation system.

FIG. 9 is a simplified functional block diagram of an embodiment of a transmitter 900 in a layered modulation system. The transmitter 900 includes means for receiving base layer data 910 coupled to means for encoding the base layer data 960.

The transmitter 900 also includes means for receiving enhancement layer data 920. The transmitter includes a means for determining a base only mode 930 coupled to the means for receiving the base layer data 910 and means for receiving the enhancement layer data 920. The means for determining a base only mode 930 can monitor the data streams or can receive a control signal that indicates a base only mode.

A means for generating stuffing data 940 is coupled to the means for determining a base only mode 930 and can generate stuffing data in response to the base only mode being active. A means for appending the stuffing data with the enhancement layer data 950 is coupled to the means for receiving enhancement layer data 920 and the means for generating stuffing data 940. The means for appending the stuffing data with the enhancement layer data 950 appends the stuffing data to the enhancement layer data or substitutes the stuffing data for enhancement data when a base only mode is active.

The means for appending the stuffing data with the enhancement layer data 950 is coupled to a means for encoding enhancement layer data 980. The means for encoding enhancement layer data 980 can thus encode enhancement layer data, stuffing data, or a combination of enhancement layer data and stuffing data, depending on a transmitter mode.

A means for mapping encoded data 970 is coupled to the means for encoding the base layer data 960 and the means for encoding enhancement layer data 980. The means for mapping encoded data 970 can be configured to map the encoded data to a signal constellation selected from a plurality of signal constellations. The constellation can be selected based on the status of the base only mode, that is, depending on whether the base only mode is active. The means for mapping encoded data 970 can be configured to select a base layer symbol and a corresponding enhancement layer symbol and map the selected symbols to a constellation point. Additionally, the means for mapping encoded data 970 can be configured to map the encoded data or signal constellation points to a logical channel, and map the logical channel to a physical channel. A means for transmitting data 990 is coupled to the means for mapping encoded data 970 for transmitting the mapped data.

Systems, methods, and apparatus for transmitting layered and non-layered data in a layered modulation system have been described. A transmitter can seamlessly handle layered or non-layered data in a stream that is assigned to a logical channel configured for layered modulation.

The various illustrative logical blocks, modules, and circuits described in connection with the embodiments disclosed herein may be implemented or performed with a general purpose processor, a digital signal processor (DSP), a Reduced Instruction Set Computer (RISC) processor, an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The steps of a method, process, or algorithm described in connection with the embodiments disclosed herein may be embodied directly in hardware, in a software module executed by a processor, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

The invention claimed is:

1. A receiver configured to receive layered and non-layered data over a layered modulation channel, the receiver comprising:
    a symbol deinterleaver configured to receive a tone modulated by a constellation point and generate a base layer symbol and an enhancement layer symbol from the tone, and further configured to generate a decoder control signal;
    a base layer processor coupled to the symbol deinterleaver, and configured to receive the base layer symbol and decode a base layer data; and
    an enhancement layer processor coupled to the symbol deinterleaver, and configured to receive the enhancement layer symbol and selectively decode an enhancement layer data based on the decoder control signal.

2. The receiver of claim 1, wherein the enhancement layer decoder is further configured to generate stuffing data and append the stuffing data to the enhancement layer data based on the decoder control signal.

3. A receiver configured to receive layered and non-layered data over a layered modulation channel, the receiver comprising:
    symbol deinterleaver means for receiving a tone modulated by a constellation point, generating a base layer symbol and an enhancement layer symbol from the tone, and generating a decoder control signal;
    base layer means to the symbol deinterleaver means for receiving the base layer symbol and decoding a base layer data; and
    enhancement layer means coupled to the symbol deinterleaver means for receiving the enhancement layer symbol and selectively decoding enhancement layer data based on the decoder control signal.

4. The receiver of claim 3, wherein the enhancement layer decoder is further configured to generate stuffing data and append the stuffing data to the enhancement layer data based on the decoder control signal.

5. A method of receiving layered and non-layered data over a layered modulation channel, the method comprising:
    receiving a tone modulated by a constellation point;
    generating a base layer symbol and an enhancement layer symbol from the tone;
    generating a decoder control signal;
    decoding the base layer data; and
    selectively decoding the enhancement layer data based on the decoder control signal.

6. The method of claim 5, further comprising:
    generating stuffing data; and
    appending the stuffing data to the enhancement layer data based on the decoder control signal.

7. A non-transitory computer readable medium encoded with a computer program comprising:
    instructions for receiving a tone modulated by a constellation point;
    instructions for generating a base layer symbol and an enhancement layer symbol from the tone;
    instructions for generating a decoder control signal;
    instructions for decoding the base layer data; and
    instructions for selectively decoding the enhancement layer data based on the decoder control signal.

8. The non-transitory computer readable medium of claim 7, further comprising:
    instructions for generating stuffing data; and
    instructions for appending the stuffing data to the enhancement layer data based on the decoder control signal.

* * * * *